INVENTORS
FRANK W. FRICK
ROBERT E. KIRSCHMAN

BY Harry W. Hargis III

AGENT

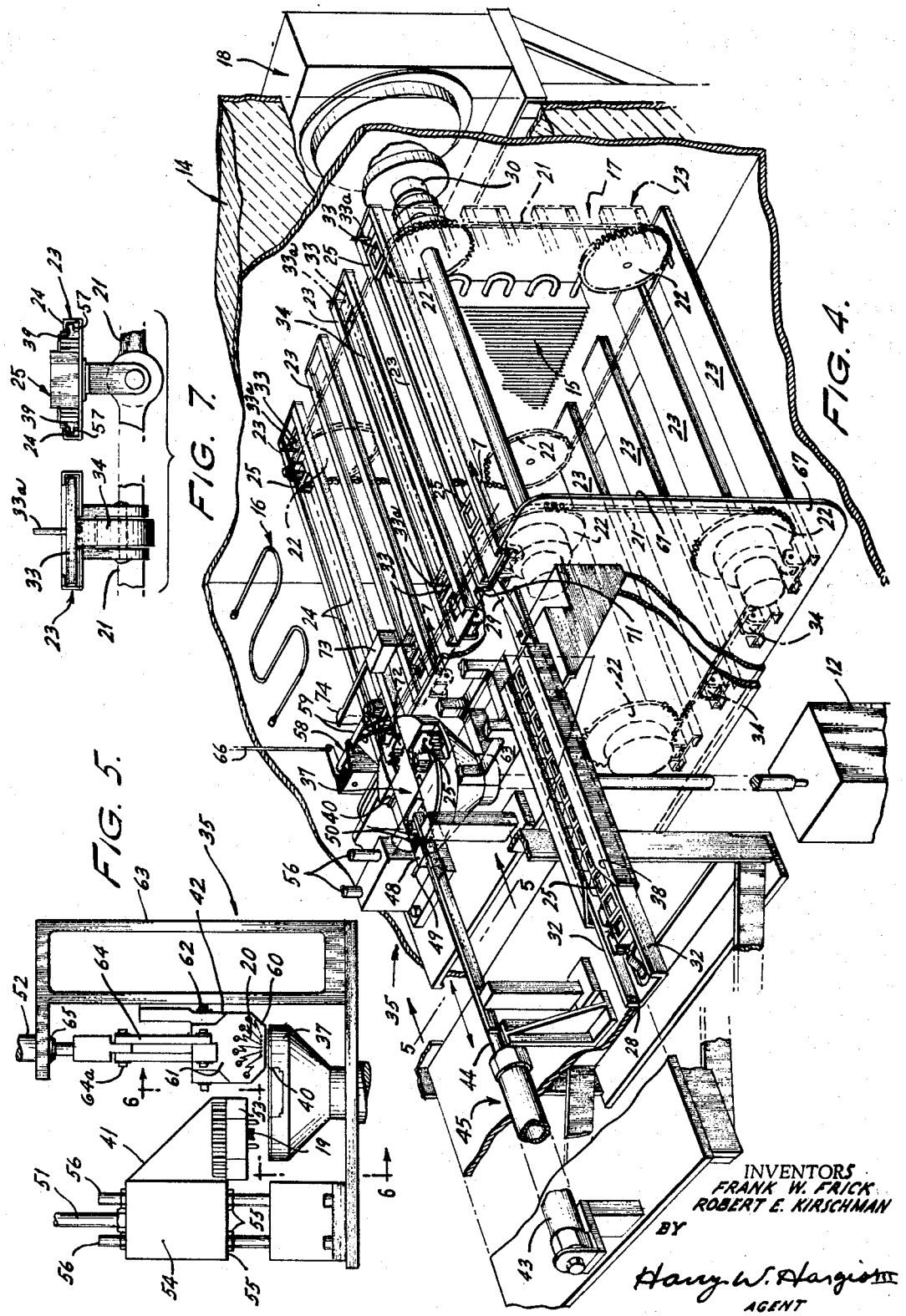

United States Patent Office 3,412,333
Patented Nov. 19, 1968

3,412,333
APPARATUS FOR SEQUENTIALLY TESTING
ELECTRICAL COMPONENTS UNDER CONTROLLED ENVIRONMENT CONDITIONS
Frank W. Frick, Lansdale, and Robert E. Kirschman,
Sellersville, Pa., assignors to Philco-Ford Corporation,
Philadelphia, Pa., a corporation of Delaware
Filed Nov. 15, 1965, Ser. No. 507,776
7 Claims. (Cl. 324—158)

ABSTRACT OF THE DISCLOSURE

An apparatus for automatically testing intergrated circuit devices, including housings having lead wires extending therefrom, comprises an environmental chamber for maintaining ambient atmospheric temperature conditions to which the tested devices are subjected. A plurality of devices are supported on a conveyor arranged to move through the chamber, in sequential step-by-step fashion. A loading station provides for introducing devices into the chamber and onto the conveyor, and a set of test probes is provided within the chamber, downstream of the loading station relative to the direction of movement of the conveyor. The test probes are reciprocable to engage lead wires of a device as it is presented by the conveyor for alignment with the test probes. Mechanism is provided for extracting each component as it is tested.

This invention relates to electrical test apparatus, and more particularly to improved mechanized test apparatus adapted to test electrical components under controlled environmental conditions including extremes of temperature.

While of broader applicability, the invention has special utility in the handling of and establishing of electrical test connections to components such as integrated microcirciut devices of the type comprising protective, hermetically sealed envelopes or housings from which extend a plurality of lead wires.

When integrated microcircuit devices are tested electrically, it is often required that the test be conducted at such temperatures as they may be subjected to in the course of their intended use. These tedperatures may comprise, for example, a range from about −65° C. to +150° C. In order to stabilize the temperature of a device at the desired value for testing, it is subjected to an environment maintained at the selected temperature value for a predetermined required length of time to allow stabilization. Difficulties arise in providing apparatus for performing tests automatically due to variations in packaging of the circuit devices. For example, and in accordance with presently preferred practice, integrated circuit device housings either may take the form of a so-called "flat-pack" in which sets of leads extend in opposite directions and are coplanar with the housing, or they may take the form of a so-called "T0-5 can" from which leads extend unidirectionally. Moreover, the circuit devices may have various uses, some of which require adherence to close tolerances and others which do not. The test apparatus must be capable of sorting tested circuit devices according to such variations in tolerances as well as according to accepted and rejected devices.

It is a broad objective of this invention to provide novel and improved test apparatus adapted automatically to test integrated circuit devices of various types, and, characteristically, of relatively small size, under conditions of such extreme temperatures as they may be subjected to when in use.

It is another, and more specific objective of the invention to provide improved environmental test apparatus for integrated circuit devices of various known types.

It is a further objective of the invention to provide novel unitary electrical test apparatus capable of handling electrical circuit devices of various configurations. For example, test apparatus embodying the invention is featured by means for mounting devices of various types that facilitates handling and testing the devices by substantially the same test apparatus.

It is a further specific objective of the invention to provide environmental test apparatus for integrated microcircuit devices that minimizes lead capacitance by disposing the lead wires in a manner permitting applicaton of the test probes in very close proximity to the circuit device housing, irrespective of the shape of the latter.

To the foregoing general ends the invention contemplates, in apparatus for the automatic testing of electrical component means, such as an integrated circuit device including a housing having lead wires extending therefrom, the provision of an environmental chamber for maintaining an ambient atmospheric temperature condition within which the component means are to be tested, support means for a plurality of the component means, and conveyor means for moving the support means through the chamber in sequential, step-by-step fashion. There is further provided means defining a loading station for introducing component means into the chamber and onto the support means, and test probe means within the chamber, downstream of the loading station as respects the direction of movement of the conveyor means. The test probe means comprises a reciprocable set of test probes operable to engage the lead wires of the component means as the end of each supporting means is presented for alignment with the test probe means. Means is provided to feed the component means along the line of the supporting means and singly to said test probe means within said chamber, and to extract each component means as it is tested.

A preferred sequence of operation from the time an integrated circuit device is inserted into its carrier to the time it is automatically extracted from the test apparatus includes: (1) placing a device into an individual carrier; (2) inserting a plurality of such carriers into a loading magazine; (3) moving the carriers from the loading magazine through the side of the test chamber and into a transfer magazine carried by the conveyor; (4) indexing the conveyor to move a loaded transfer magazine, over a period of time sufficient to stabilize the temperature of the device to the temperature of the chamber, to a position in which the devices are presented for registry with the set of test probes; (5) feeding the carriers sequentially and individually into position for engagement of the device leads by the set of test probes; (6) testing the device;

(7) withdrawing the set of test probes from contact with the device leads; and (8) extracting the carrier and its associated tested device from the test chamber. The invention provides novel apparatus for carrying out the foregoing operations automatically and sequentially.

The foregoing as well as additional objectives and advantages of the invention will be more clearly understood from a consideration of the following description, taken in light of the accompanying drawing in which:

FIGURE 4 is a perspective showing, with parts removed or broken away, of test mechanism embodying the invention, and housed within the apparatus illustrated in FIGURE 1;

FIGURE 5 is an elevational showing of a portion of the apparatus partially illustrated in FIGURE 4, as seen looking in the direction of arrows 5—5 applied thereto;

FIGURE 7 is a view of apparatus seen in FIGURE 4, partly in section and with parts broken away, and looking in the direction of arrows 7—7.

Figure 1:
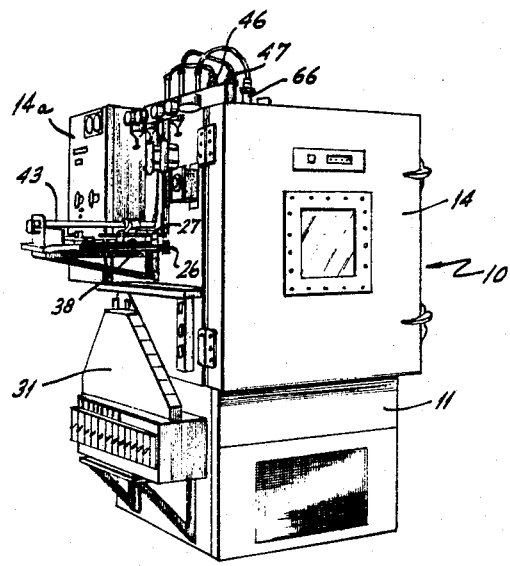
FIGURE 1 is a perspective showing, on a somewhat reduced scale, of apparatus embodying the invention.

With more particular reference to the drawings, and first to FIGURES 1 and 4, environmental test apparatus 10 comprises base structure 11 surmounted by a thermally insulated environmental chamber 14 having provision for cooling its interior, such as a cooling coil shown somewhat diagrammatically at 15, or for heating its interior, such as heating coil shown somewhat diagrammatically at 16. Means for energizing either cooling coil 15 or heating coil 16, and the associated controls, is conventional, and will not be described further in detail.

Housing means designated generally by the numeral 14a contains circuits for testing components as they are moved through chamber 14. Inasmuch as a detailed description of the electrical test circuits is not necessary for a complete understanding of the invention, no such description will be undertaken. Accordingly, the foregoing as well as ensuing descriptive matter is directed to such mechanical constructional features as characterize the invention.

Base structure 11 contains drive mechanism 12 for a portion of test probe device 13, and conveyor means 17 is disposed within chamber 14 and is operable to move components to be tested past device 13, as will hereinafter be more fully described. Conveyor means 17 comprises two chains, designated generally by the numeral 21, and movable about spaced sprockets 22 having their axes extending horizontally. One of the sprockets is driven through shaft 30 in step-by-step fashion by conventional indexing means 18, and at such a rate as to ensure temperature stabilization of the component means or devices to be tested.

As seen also to advantage in FIGURE 7, a plurality of spaced, parallelly extending transfer magazines 23 are supported at their ends by chains 21, each magazine 23 comprising a pair of channels 24 having legs presented toward one another to form grooves 39 which serve as guides for the device carriers 25 to be described in more detail with reference to FIGURES 2 and 3.

Loading and unloading ports 26 and 27, respectively, for the integrated circuit devices and their carriers 25 are provided in one side of the test chamber, and conventional sorting apparatus 31 for tested devices is located below the ports 26 and 27.

Figure 2:
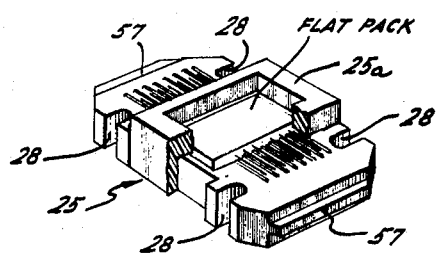
FIGURE 2 is an enlarged perspective showing of one form of carrier-supported component means capable of being tested by the apparatus illustrated in FIGURE 1, and with portions of the carrier broken away.
Figure 3:
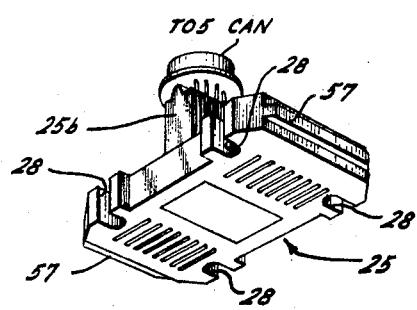
FIGURE 3 is a showing similar to FIGURE 2, but from a different angle, of another form of component means capable of being tested by the apparatus illustrated in FIGURE 1 and shown as supported by a carrier of the kind used to support the component shown in FIGURE 2.

Carriers of the type seen at 25 in FIGURES 2 and 3 each support an integrated circuit device. It is a feature of the invention that either devices housed in flat pack envelopes as seen in FIGURE 2, or devices housed in T0-5 cans as seen in FIGURE 3, may be tested using the same essential carrier mechanism. With respect to FIGURE 2, it is seen that a flat-pack housed device is supported with its leads extending into upwardly facing slots and with its housing portion nested within a central aperture in the carrier. A U-shaped clamp 25a overlies the housing and portions of the leads, and is held through frictional engagement of the leg portions of the clamp with sides of the carrier. It is therefore appreciated that a carrier 25 is adapted to support a flat-pack device in such a position that its leads are facing upwardly.

With respect to FIGURE 3, it is seen that the carrier body itself has been inverted and has been provided with a plug 25b inserted into the central opening of the carrier body, and adapted, in cooperation with the body, frictionally to retain lead wires of a device housed within a T0-5 can. It will be appreciated that a carrier 25 supports a T0-5 can device in such a position that its lead wires face laterally.

Carriers 25 as seen in either FIGURE 2 or FIGURE 3 are placed in a loading magazine 32 as illustrated in FIGURE 4 having the configuration of an elongate channel in which the legs are extending upwardly. With the magazine 32 inserted in guide 38 aligned with loading port 26, carriers 25 are inserted through the loading port into an elongated support such as a transfer magazine 23, by forcible movement of the carriers along the magazines. It will be appreciated that each carrier 25 includes laterally outwardly presented ridges 57 that are slidably received within the grooves 39, as best seen in FIGURES 4 and 7. In FIGURE 4, a group of carriers 25 have just been loaded, and a loading magazine 32 awaits loading into the next empty transfer magazine 23.

Each transfer magazine 23 includes a slidable, plunger-like element 33 that engages the end one of the carriers, and a substantially constant-tension extensible and retractable coiled spring 34 resiliently urges the carriers an amount sufficient to force them from transfer magazine 23 when it is indexed into alignment with the test station, designated generally by the numeral 35. Immediately upon loading, the carriers are prevented from being forced from the associated transfer magazine by a spring latch 29. Also, it will be appreciated that a track 67 of suitable bearing material overlies the ends of transfer magazines 23 and thereafter prevents ejection of the carriers 25. Slots 71 and 72 are provided in the track, in registry with the loading and unloading ports, respectively to permit passage of the carriers to and from the transfer magazines.

When a transfer magazine 23 has been loaded with carriers 25, an index mechanism 18 drives the conveyor 21, through the agency of a sprocket 22, to advance one step at a time, the rate of advance being preset to insure temperature stabilization of the circuit devices before they reach test station 35. The spacing of the transfer magazines 23 is such that for each increment of movement the conveyor will present one magazine at the loading port for receiving a load of carriers, and will present a loaded magazine at the test station for individual unloading and testing of components and the carriers.

When a transfer magazine 23 reaches the test station, a latch 58 provided with prongs 59 that register with slots 28 in the carriers is raised by pneumatic actuator 66 atop the test chamber 14, whereupon the tensioned element 33 forces the end carrier 25 from the magazine into one of four recesses 40 provided in the peripheral, upwardly presented surface of a turret 37. The latch 58 then is lowered and engages slots 28 of the next carrier, holding it in place until it is fed to the turret. Turret 37 is rotatable to move the carrier to a position for association with one of two test heads 41 and 42.

As will be understood from inspection of FIGURES 4 and 5, turret 37 rotates clockwise if T0–5 housed circuit devices are to be tested (FIGURE 3), and counter-clockwise if flat-pack housed devices (FIGURE 2) are to be tested. Turret 37 rotates 90° to the desired test position from the position in which the circuit device carrier 25 is fed from transfer magazine 23 to recess 40 in the turret. A further 90° rotation of turret 37 moves the circuit device carrier 25 to a position in which it may be removed from the recess in turret 37 by means of an extractor 45 also provided with prongs that engage slots 28 in a carrier 25, as will be explained in more detail later.

Extractor 45 is actuated by means of a pneumatic plunger linkage 44 which deposits the circuit device either in a sorter or in a loading magazine.

Figure 6:
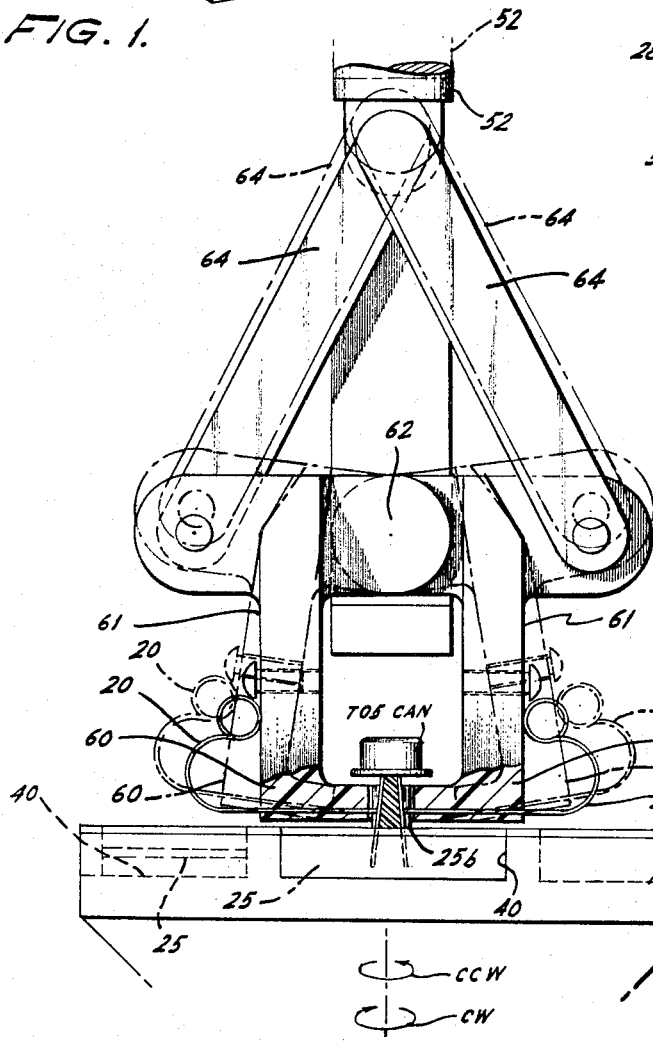
FIGURE 6 is an elevational showing, partly in section and with parts removed, looking in the direction of arrows 6—6 applied to FIGURE 5.

With more particular reference to the test station 35 as illustrated in FIGURES 5 and 6, it is seen that test heads 41 and 42 comprise a pair of sets of test probes 19 and 20, respectively. Each of the sets of test probes 19 and 20 is operable by individual actuator means 46 and 47 disposed atop chamber 14 and coupled with the probes by vertically extending push rods 51 and 52. Conveniently, the actuator means 46 and 47 comprise pneumatically operated pistons (not shown) slidable within pneumatic cylinders.

The set of test probes 19 for the flat-pack housed devices comprises an insulative block 53 from which extend the unidirectionally presented rows of spring loaded test probes or contacts 19 in the form of pins. Block 53 is supported upon a bracket 54 provided with spaced bearings 55 slidable upon a pair of parallel, vertically extending rods 56.

The set of test probes 20 for the T0–5 housed devices are mounted upon a pair of like, electrically insulative blocks 60 and includes test contacts arranged in a row on each of the blocks 60 and presented toward one another so that they will engage suitably presented leads of the devices to be tested. The blocks are supported by a pair of like jaws 61 that are pivotally mounted at 62 upon vertically extending frame 63. A scissors linkage 64 and actuator pin 64a thereof connects the jaws 61 to vertically extending push rod 52 slidable in a bearing 65 provided on frame 63.

Extractor 45 for removing a tested device and is carrier from turret 37 is actuated by push rod 44, and comprises a link 48 pivotable about a pin 49 for movement of prongs 50 carrier by the link toward and away from the turret. The prongs 50 are engageable with slots 28 provided in a carrier 25 to move the carrier out of a recess 49 and away from turret 37. Push rod 44 is operable by a pneumatic piston and cylinder assembly 43 disposed exteriorly of the test chamber 14, in the vicinity of unloading port 27.

Summarizing, a magazine 33 containing a plurality of carriers 25, preferably sixteen, is loaded into the environmental chamber 14 through loading port 26, each carrier supporting either the flat-pack housed device or the T0–5 housed device. The carriers are forced from loading magazine 32 to the transfer magazine 23 by means of a push rod (not shown). Plunger element 33 is moved forcibly to the end of the transfer magazine as the carriers are loaded, and in so doing extends spring 34 coiled and retained at the loading end of the transfer magazine. A spring loaded latch 29 at loading port 26 prevents element 33 from ejecting the carriers, under the urging of spring 34, once they are loaded. Index mechanism 18 now advances the transfer magazines 23 one position and the next empty transfer magazine is presented at port 26 for loading. The transfer magazines are indexed in step-by-step fashion down the front, across the bottom and up the back of the chamber at a rate which allows the devices in carriers 25 to stabilize to within ±.5° C. of the test temperature required. At the test turret 37, the carriers 25 are forced by the spring loaded plunger element 33 into recess 40 in the test turret. If the devices under test are flat-packs (FIGURE 2) the turret is rotated 90° counter-clockwise, and their carriers are placed under the flat-pack test head 41. If the devices are the T0–5 type (FIGURE 3), the turret is rotated 90° clockwise and their carriers are placed under the T0–5 test head 42. After completion of a test, turret 37 is rotatably indexed another 90° and the tested device and its carrier are extracted from the chamber by extractor 45. As the tested device and its carrier are extracted from the chamber, the carrier may be automatically reloaded into a magazine, such as loading magazine 32, when data logging is desired. Alternatively the device and its carrier may be directed into sorter 31 where the device can be sorted into any one of 16 categories, in accordance with conventional practice.

In further accordance with construction of the apparatus, and with reference to FIGURE 4, each of the tensioned elements 33 is provided with a vertically extending pin 33a that is so positioned that upon feeding of the last carrier in a transfer magazine 23 to turret 37 a suitably positioned switch arm 74 is engaged and pivoted. Upon pivoting, switch arm actuates a switch 73 operable to energize indexing means 18 to drive the conveyor means 17 to move the next succeeding transfer magazine 23 into alignment with the test probe means 13.

As an example of the versatility of the test apparatus, FIGURES 4 and 6 illustrates testing of a T0–5 can housed device as they are fed from a transfer magazine being unloaded, whereas a loading magazine filled with flat-pack housed devices is shown in FIGURE 4 just prior to feeding the devices into an empty transfer magazine for conveyance to the test station.

We claim:

1. In apparatus for the automatic testing of electrical components of the type including a housing having lead wires extending therefrom, the combination of: a chamber for maintaining said components at temperature conditions under which they are to be tested; movable component-supporting conveyor means for moving said components through said chamber sequentially; means defining a loading station for introducing said components into said chamber for support by said conveyor means; means within said chamber defining a test station comprising test probe means disposed downstream of said loading station, relative to the direction of movement of said conveyor means, and means for removing said components from said conveyor means and for presenting said components individually for testing, said test probe means including a set of conductors, movable into electrical contacting engagement with lead wires of individual components, as the components are presented for testing; and means defining an unloading station for removing said components from said chamber upon completion of testing and further characterized in that said test probe means includes at least two sets of test probes, one of said sets including probes presented for unidirectional movement into engagement with coplanar lead wires of one type of component undergoing test, and the other of said sets including probes adapted for movement toward and into engagement with unidirectionally presented lead wires of another type of component, and means for receiving components from said conveyor means and selectively operable to present said components for engagement by one or the other of the recited sets of test probes.

2. Apparatus according to claim 1 and further characterized in that said conveyor means comprises a plurality of elongate transfer magazines movable in laterally spaced, relationship through said chamber, and further including: means for moving said conveyor means in step-by-step fashion, said conveyor means being halted after each movement in such a position that one of said elongated magazines is presented endwise at said loading station to receive said components as they are introduced into said chamber, and another of said magazines is presented endwise at said test probe means, said magazine in said last recited position being operable to urge components into position for handling by said means for selectively presenting components for engagement by one or the other of the recited sets of test probes.

3. In apparatus for the automatic testing of electrical components of the type including a housing having lead wires extending therefrom, the combination of: a chamber for maintaining said components at temperature conditions under which they are to be tested; movable component-supporting conveyor means for moving said components through said chamber sequentially; means defining a loading station for introducing said components into said chamber for support by said conveyor means; means within said chamber defining a test station comprising test probe means disposed downstream of said loading station, relative to the direction of movement of said conveyor means, and means for removing said components from said conveyor means and for presenting said components individually for testing, said test probe means including a set of conductors, movable into electrical contacting engagement with lead wires of individual components, as the components are presented for testing; and means defining an unloading station for removing said components from said chamber upon completion of testing in which said means defining a test station is characterized by the inclusion of turret means provided with a plurality of angularly spaced, radially outwardly presented recesses each presentable, sequentially, as said turret means is rotated, into a first position for receiving a component from said conveyor means, then to a second position in which a received component is engaged by said conductors of said test probe means, and to a third position in which said component is presented for removal from said recess by said means providing for removal of said components from said chamber.

4. In apparatus for the automatic testing of electrical components of the type including a housing having lead wires extending substantially unidirectionally therefrom, the combination comprising: a chamber for maintaining an ambient temperature condition under which said components are to be tested; elongated supports each adapted to carry a plurality of said components; conveyor means for moving said supports through said chamber in sequential step-by-step fashion; means defining a loading station for introducing said components into said chamber for support by said elongated supports, during pauses in movement of the latter; test probe means within said chamber downstream of said loading station, relative to the direction of movement of said conveyor means, said test probe means comprising at least one reciprocable set of test contacts operable for extension into engagement with the lead wires of individual components carried by said supports as said supports are presented for alignment with said test probe means, said test contacts being disposed and adapted for substantially vertical movements and for movements substantially transversely of and into electrical contacting engagement with lateral portions of lead wires extending unidirectionally from a component, said contacts engaging corresponding ones of said lead wires in regions closely spaced from the housing of said components, said test probe means comprising a vertically extending base provided with a pair of jaws pivotable about a pin extending horizontally from said base and which jaws support said test contacts, a pair of arms extending outwardly from said jaws transversely of the axis of said pin, a scissors linkage, each link of which is pivotally connected at one end to said arms, and both links pivotally connected together at their other ends, said latter connection being made through the agency of an actuator pin; a vertically reciprocable push-rod extending transversely of said actuator pin and coupled thereto to move the same; and means operable to feed said components along the line of said elongated supports and singly to position such components for engagement by said test contacts.

5. In apparatus for the automatic testing of electrical components of the type including a housing having lead wires extending therefrom, the combination of: a chamber for maintaining said components at temperature conditions under which they are to be tested; movable component-supporting conveyor means for moving said components through said chamber sequentially; means defining a loading station for introducing said components into said chamber for support by said conveyor means; means within said chamber defining a test station comprising test probe means disposed downstream of said loading station, relative to the direction of movement of said conveyor means, and means for removing said components from said conveyor means and for presenting said components individually for testing, said test probe means including a set of conductors, movable into electrical contacting engagement with lead wires of individual components, as the components are presented for testing; and means defining an unloading station for removing said components from said chamber upon completion of testing and further characterized in that said test probe means comprises a base provided with a pair of jaws pivotable about means defining a first pivot, said jaws supporting said set of conductors, a pair of arms extending outwardly from said jaws transversely of the axis of said first pivot, a scissors linkage, each link of which is pivotally connected at one end to said arms, an actuator pin connecting both links pivotally at their other ends, and reciprocable push-rod means extending transversely of said actuator pin and coupled thereto to move the same transversely of its axis, whereby to move said set of conductors into electrical contacting engagement with lead wires of individual components.

6. In apparatus for the automatic testing of electrical components of the type including a housing having lead wires extending substantially unidirectionally therefrom, the combination comprising: a chamber for maintaining an ambient temperature condition under which components are to be tested; conveyor means for moving a plurality of said components through said chamber; and including a reciprocable set of test contacts movable into engagement with the lead wires of individual components carried by said conveyor means, said test contacts being disposed and adapted for movements substantially transversely of, and into electrical contacting engagement with lateral portions of component lead wires, said test probe means comprising a base provided with a pair of jaws pivotable about means defining a first pivot, said jaws supporting said test contacts, a pair of arms extending outwardly from said jaws transversely of the axis of said first pivot, a scissors linkage, each link of which is pivotally connected at one end of said arms, and an actuator pin connecting both links pivotally at their other ends; reciprocable pushrod means extending transversely of said actuator pin and coupled thereto to move the same transversely of its axis; and means operable to feed said components from said conveyor means, and singly to position such components for engagement by said test contacts.

7. In apparatus for automatic testing of electrical components of the type including a housing having lead wires extending therefrom, some of said components having coplanar arrays of lead wires and other of said components having unidirectionally presented arrays of lead wires, the combination of: a chamber for maintaining said components at temperature conditions under which they are to be tested; movable component-supporting conveyor means for moving said components through said chamber sequentially; means defining a loading station for introducing components of either of said types into said chamber for support by said conveyor means; and means within said chamber defining a test station comprising a pair of sets of test probe means disposed downstreaam of said loading station, relative to the direction of movement of said conveyor means, the test probe means of one set of said pair being mounted for movements into and out of electrical contacting engagement with lead wires of a coplanar array, and the test probe means of the other set of said pair being mounted for movements into and out of electrical contacting engagement with lead wires of unidirectionally presented arrays, and said test station further including turret means rotatable to bring components into registry with one or the other of said pair of sets of test probe means, dependent upon whether the component has a coplanar array of lead wires or a unidirectionally presented array of lead wires.

References Cited

UNITED STATES PATENTS

| | | | |
|---|---|---|---|
| 3,032,191 | 5/1962 | Clukey | 324—158 XR |
| 3,039,604 | 6/1962 | Bickel | 324—158 XR |
| 3,094,212 | 6/1963 | Moore | 324—158 XR |
| 3,179,248 | 4/1965 | Manley | 324—158 XR |
| 3,179,248 | 4/1965 | Manley | 324—158 XR |
| 3,264,918 | 8/1966 | Lockhart | 324—158 XR |

RUDOLPH V. ROLINEC, *Primary Examiner.*

E. L. STOLARUN, *Assistant Examiner.*